April 6, 1943.    E. A. ZEBULSKE    2,315,760
CONNECTING MEANS
Filed Dec. 17, 1942

INVENTOR
EDWARD A. ZEBULSKE
BY
Bean, Brooks Buckley + Bean.
ATTORNEYS

Patented Apr. 6, 1943

2,315,760

UNITED STATES PATENT OFFICE

2,315,760

CONNECTING MEANS

Edward A. Zebulske, North Tonawanda, N. Y., assignor to Hyla F. Maynes and Emma C. Maynes, both of North Tonawanda, N. Y.

Application December 17, 1942, Serial No. 469,376

8 Claims. (Cl. 287—54)

This invention relates to means for ready assembly and disassembly of structural supporting elements.

The device of the present invention is particularly useful in the connection of tubes, pipes or bars for erecting temporary but wholly rigid and structurally secure supports. Previous devices of this general nature have been proposed wherein tapered pins and the like are provided for securing connecting elements in desired assembled relation, but in the constructions of the prior art, friction alone or friction assisted by the force of gravity have usually been relied upon for retention of the locking pins.

By my invention I provide a connecting means possessing sufficient inherent resilience to securely lock the connected elements against disassembly. Further, the pin means employed as the final locking element is not subject to unintentional unlocking displacement and may be used in any direction without respect to the force of gravity acting thereon. Connecting devices of the kind shown herein are particularly useful in the erection of structural frameworks of carnival rides, scaffolding, derricks and cranes, and miscellaneous structures of a somewhat temporary nature, particularly when it is desired to dismantle the structure and erect it at some other location.

My invention comprises generally the provision of means permanently and rigidly associated with the end of an elongate structural element, such as a pipe, bar, tube or the like, for interfitting engagement with a second means which is fixedly secured to a second pipe, bar, tube or the like. The second means may be attached to the pipe or bar medially thereof or adjacent an end. The two means may be readily interfitted and a preferably tapered locking pin inserted in such manner as to engage cooperating seats formed in both means to wedge the element into resiliently locked fixed assembly.

The locking means of the present invention are most frequently employed in securing a pipe endwise against the side of another in angular relation; most commonly, but not necessarily, at approximately right angles. The devices are so arranged that two pipes may be secured against opposite side of another pipe in co-axial position to provide what is, in effect, a cross construction, one of the elements of the cross being continuous and the other discontinuous.

A further object of the present invention is to provide a connection of this kind wherein the locking pin is freely insertable from either direction along its axis. This feature is useful insofar as obstructions of one kind and another, either associated with the pipes or bars proper or otherwise, may render it impossible or inconvenient to assemble the pin from a particular direction.

The inherent resilience of the connection of the present invention provides a wholly adequate range of manufacturing tolerance within which the connection will function in an entirely satisfactory maner.

While specific forms of the invention are illustrated in the drawing and described in detail in the following specficaton, it is to be understood that the principles of my invention are not limited thereto, nor otherwise than as defined in the appended claims.

Figure 1:
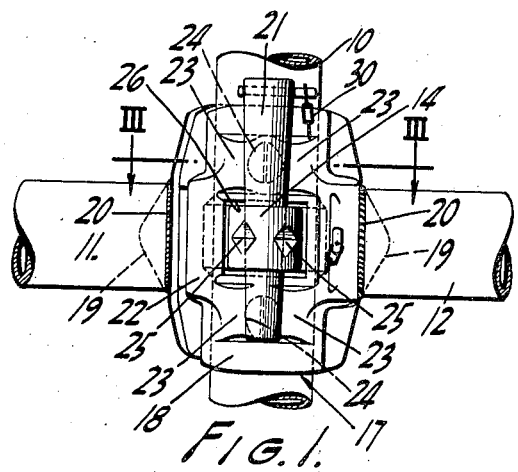
Fig. 1 is an elevational view of piping or tubing connected in the form of a cross disposed in a substantially vertical plane.
Figure 2:
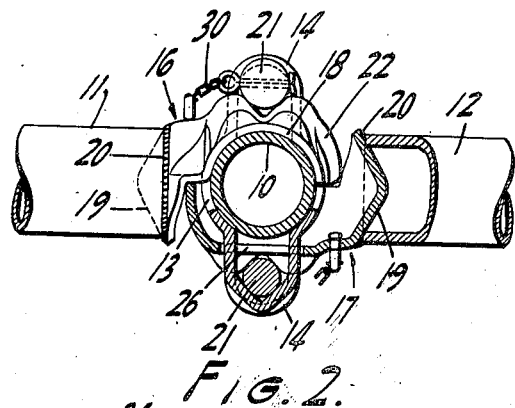
Fig. 2 is a plan view of the connection of Fig. 1 with one of the two connections shown in cross-section and the other in elevation.

Throughout the several figures of the drawing like characters of reference denote like parts and in Figs. 1 and 2 the numeral 10 designates a vertical structural element in the nature of a pipe or tube and the numerals 11 and 12 designate pipes or tubes extending perpendicularly therefrom in a horizontal direction. It will be understood that reference here to vertical and horizontal directions is merely for clearness in describing the disclosed examples and that the connection of the invention may be used with the connected pipes extending in any desired direction whatever. In Fig. 2 the numeral 13 designates an encircling band which is adapted to be secured to the pipe 10 by welding or the like and which has oppositely extending loop or bight portions 14 formed therein to extend laterally away from the pipe 10.

While two connecting pipes 11 and 12 are shown in Figs. 1 and 2, to illustrate the mode in which two such pipes are joined to the pipe 10 co-axially with respect to each other, the connections are identical and like numerals refer to corresponding parts thereof. It is to be understood that when only a single pipe 11 or 12 is to be connected to pipe 10, only a single loop 14 need be secured to the pipe 10 and, while an encircling band like the one designated 13 may still be employed, a mere U-shaped clip with arcuate terminal portions for securement to the pipe 10 will suffice. In Fig. 2 the upper connector, designated generally 16 and provided for connection of the pipe 11 to the pipe 10, is shown in elevation, while the lower connector, designated generally 17 and provided for connection of the pipe 12 to the pipe 10, is shown in a cross-section taken substantially centrally thereof.

Each of the connectors 16 and 17 is drawn from a unitary flat blank of sheet metal, the metal normally used in drawing forms therefrom having a moderate degree of resiliency as compared with cast or forged metal. Each connector comprises an arcuately formed saddle portion 18, complemental to and adapted to seat against the periphery of pipe 10, and, as a unitary lateral extension thereof, a substantially conical formation 19 which provides a boss for rigid securement in the end of either of the pipes 11 and 12. The conical formation of the bosses 19 permits their association with the ends of pipes of varying diameters and securement may be by welding, as indicated at 20. The saddle portion 18 has a central opening 26 which fits loosely over one of the loops 14 whereby, in assembled position, the loop projects through the opening for engagement with a locking pin 21.

The saddle portion 18 of each connector 16 and 17 seats closely against the pipe 10 at its opposite ends but is bulged away therefrom in its medial portion, as at 22 in Fig. 1, to clear the encircling band 13. The points where the bulge 22 and the seating end portions of the saddle 18 merge is marked by the presence of pairs of projections which take the form of hollow protuberances 23, each pair cooperating to provide a seat for the locking pin 21.

It will be noted that the seats formed by the protuberances 23 are aligned with the projecting loop 14 whereby the tapered locking pin 21 may be projected through the loop 14 until it wedges between the interior of the loop and the seats formed by the protuberances 23.

Figure 3:
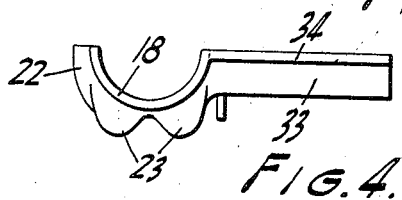
Fig. 3 is a fragmentary cross-sectional view of a portion of the connection taken approximately on the line III—III of Fig. 1 but on a greatly enlarged scale.

In the form shown the protuberances 23 have flat inner faces 24 which form seats in the nature of V-blocks, and it will be seen from a consideration of the enlarged fragmentary cross-section, Fig. 3, that they yieldingly seat the pin to flexibly lock it against accidental disassembly.

It will be noted that each of the loops 14 has a pair of indented embossments which form inwardly directed ridges 25 within the loop and it will be seen from a consideration of Fig. 3 that the pair of ridges 25 form an angle of about ninety degrees. Like the faces 24 of the protuberances 23, the pair of ridges 25 form a V-block and cooperate with the faces 24 to insure accurate and correct alignment of the locking pin 21 and uniform distribution of the wedging force thereof on across the faces 24. The ridges 24 also insure that the locking thrust of the pin 21 against the loop 14 is certain to be directed against its midpoint, with respect to the direction of the axis of the pipe 10. Further, this central application of the wedging force against the loop 14 is insured regardless of the direction from which the locking pin 21 is inserted.

In Fig. 3 the full line showing of the faces 24 indicates, on an enlarged scale, the resilient or yieldable deformation of the seats 24 when the connectors are in locked assembled position. The dot and dash lines illustrate the free, unlocked position of the faces 24.

The locking pin 21 may be loosely joined to each connector 16 and 17, as by means of a chain 30, merely to prevent loss or misplacement of the pin 21 during periods of disassembly.

Figure 4:
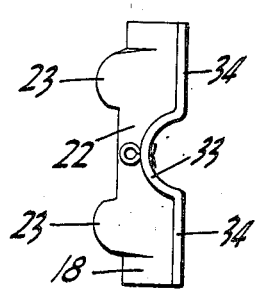
Fig. 4 is a modified form of connecting element viewed as in the case of Fig. 2; and, Fig. 5 is a right end elevational view of the connecting element of Fig. 4.
Figure 5:
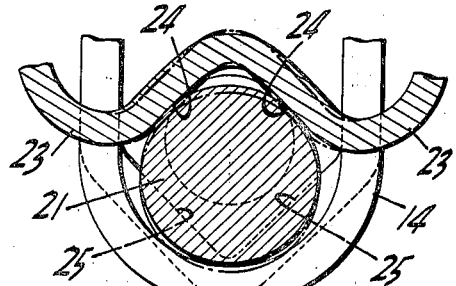

Referring now to the modified forms of Figs. 4 and 5, the connector there shown is the same in all respects as the connectors 16 and 17, excepting that the conical formations 19 of the connectors 16 and 17 are replaced, in the form of Figs. 4 and 5, by an arcuate pad 33 which extends laterally from the saddle portion 18 for engagement peripherally against a pipe corresponding to the pipes 11 and 12 of Figs. 1 and 2, adjacent an end thereof and with the saddle portion projecting from the end of the pipe as in the embodiment previously described. Integral gusset portions 34 render the saddle portion 18 and the arcuate pad 33 relatively rigid and strong.

What is claimed is:

1. Means for connecting elongate structural elements in angular relation, said means comprising a member rigidly connected with an end of one of the members and having a saddle portion, and a loop projecting laterally from the other of said members, said saddle member having an opening for receiving said loop to dispose said saddle member laterally against said other member, a tapered locking pin, said saddle member having hollow spaced pairs of protuberances at opposite sides of said opening for resiliently seating said tapered pin with its intermediate portion in wedging locking engagement in said loop.

2. Means for connecting elongate structural elements in angular relation, said means comprising a member rigidly connected with an end of one of the members and having a saddle portion projecting endwise from said member, and a loop projecting laterally from the periphery of the other of said members, said saddle member having an opening for receiving said loop to dispose said saddle member laterally against said other member, a tapered locking pin, said saddle member having hollow spaced pairs of protuberances at opposite sides of said opening for resiliently seating said tapered pin with its intermediate portion in wedging locking engagement in said loop.

3. Means for connecting elongate structural elements in angular relation, said means comprising a member rigidly connected with an end of one of the members and having a saddle portion, and a loop projecting laterally from the other of said members, said saddle member having an opening for receiving said loop to dispose said saddle member laterally against said other member, a tapered locking pin, said saddle member having hollow spaced pairs of protuberances at opposite sides of said opening for resiliently seating said tapered pin with its intermediate portion in wedging locking engagement in said loop, said loop being centrally indented to form an inner ridge for engagement with said pin whereby said pin may be interchangeably disposed in either direction through said loop.

4. Means for connecting elongate structural elements in angular relation, said means comprising a member rigidly connected with an end of one of the members and having a saddle portion projecting endwise from said member, and a loop projecting laterally from the periphery of the other of said members, said saddle member having an opening for receiving said loop to dispose said saddle member laterally against said other member, a tapered locking pin, said saddle member having hollow spaced pairs of protuberances at opposite sides of said opening for seating said tapered pin with its intermediate portion in wedging locking engagement in said loop.

5. Means for connecting elongate structural elements in angular relation, said means comprising a member rigidly connected with an end of one of the members and having a saddle portion projecting endwise from said member, and a loop projecting laterally from the periphery of the other of said members, said saddle member having an opening for receiving said loop to dispose said saddle member laterally against said other member, a tapered locking pin, said saddle member having hollow spaced pairs of protuberances at opposite sides of said opening for seating said tapered pin with its intermediate portion in wedging locking engagement in said loop, said loop being centrally indented to form an inner ridge for engagement with said pin whereby said pin may be interchangeably disposed in either direction through the loop.

6. Means for connecting elongate structural elements in angular relation, said means comprising a member rigidly connected with an end of one of the members and having a saddle portion, and a loop projecting laterally from the other of said members, said saddle member having an opening for receiving said loop to dispose said saddle member laterally against said other member, a tapered locking pin, said saddle member having hollow spaced pairs of protuberances at opposite sides of said opening for seating said tapered pin with its intermediate portion in wedging locking engagement in said loop, each pair of protuberances having facing flat portions forming V-blocks for centering said pin axially.

7. Means for connecting elongate structural elements in angular relation, said means comprising a member rigidly connected with an end of one of the members and having a saddle portion, and a loop projecting laterally from the other of said members, said saddle member having an opening for receiving said loop to dispose said saddle member laterally against said other member, a tapered locking pin, said saddle member having hollow spaced pairs of protuberances at opposite sides of said opening for seating said tapered pin with its intermediate portion in wedging locking engagement in said loop, each pair of protuberances having facing flat portions forming V-blocks for centering said pin axially, said loop being centrally indented to form a pair of inner ridges forming a V for cooperation with the flat portions of said protuberances in centering said pin and insuring correct seating thereof in locking position.

8. Means for connecting elongate structural elements in angular relation, said means comprising a member rigidly connected with an end of one of the members and having a saddle portion, and a loop projecting laterally from the other of said members, said saddle member having an opening for receiving said loop to dispose said saddle member laterally against said other member, a tapered locking pin, said saddle member having hollow spaced pairs of protuberances at opposite sides of said opening for seating said tapered pin with its intermediate portion in wedging locking engagement in said loop, said loop being centrally indented to provide a pair of inner ridges extending angularly to each other to provide a V-shaped seat for centering said pin and whereby said pin may be interchangeably disposed in either direction through said loop.

EDWARD A. ZEBULSKE.